(12) United States Patent
Nozuyama

(10) Patent No.: US 6,223,312 B1
(45) Date of Patent: Apr. 24, 2001

(54) TEST-FACILITATING CIRCUIT FOR INFORMATION PROCESSING DEVICES

(75) Inventor: Yasuyuki Nozuyama, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/229,135

(22) Filed: Apr. 18, 1994

Related U.S. Application Data

(63) Continuation of application No. 07/707,333, filed on May 29, 1991, now abandoned.

(30) Foreign Application Priority Data

May 29, 1990 (JP) .................................................. 2-137248

(51) Int. Cl.[7] ................................................ G01R 31/28
(52) U.S. Cl. ........................................ 714/724; 714/726
(58) Field of Search ............................... 371/22.1, 22.3, 371/22.4, 27; 714/724, 726, 732, 738

(56) References Cited

U.S. PATENT DOCUMENTS

| | | | |
|---|---|---|---|
| 4,317,200 | * | 2/1982 | Wakatsuki ............................ 371/25 |
| 4,404,519 | * | 9/1983 | Westcott ......................... 371/22.3 X |
| 4,465,971 | * | 8/1984 | Abeyta ............................. 324/158 R |
| 4,490,783 | * | 12/1984 | McDonough ....................... 364/200 |
| 4,754,215 | * | 6/1988 | Kawai ................................ 371/27 X |
| 4,797,886 | * | 1/1989 | Imada ................................... 371/27 |
| 4,833,395 | * | 5/1989 | Sasaki ........................... 371/22.1 X |
| 4,926,363 | * | 5/1990 | Nix .................................... 371/27 X |
| 4,947,357 | * | 8/1990 | Stewart .............................. 371/22.3 |
| 5,051,997 | * | 9/1991 | Sakashita ........................... 371/22.4 |
| 5,060,198 | * | 10/1991 | Kowalski ....................... 371/22.1 X |
| 5,138,257 | * | 8/1992 | Katsura ........................... 324/158 R |
| 5,144,627 | * | 9/1992 | Horie ................................. 371/22.1 |
| 5,155,432 | * | 10/1992 | Mahoney ...................... 371/22.3 X |
| 5,167,020 | * | 11/1992 | Kahn ................................... 395/250 |
| 5,398,250 | * | 3/1995 | Nozuyama ......................... 371/16.1 |

* cited by examiner

Primary Examiner—Dieu-Minh T. Le
(74) Attorney, Agent, or Firm—Foley & Lardner

(57) ABSTRACT

A test-facilitating circuit selectively carries out tests for self-testing and for fault diagnosis and failure analysis. In a test for fault diagnosis or failure analysis, necessary test data are supplied from outside the circuit and microprograms for self-testing are used. When carrying out a test for fault diagnosis or failure analysis, a test data generating circuit for self-testing is inhibited from outputting test data to an internal bus and test data are taken in by the internal bus from external input terminals in accordance with a microinstruction.

4 Claims, 5 Drawing Sheets

TEST-FACILITATING CIRCUIT FOR INFORMATION PROCESSING DEVICES

This application is a continuation of application Ser. No. 07/707,333, filed May 29, 1991, now abandoned.

BACKGROUND OF THE INVENTION

1. Field of the Invention

The present invention relates to a test-facilitating circuit for information processing circuits mainly comprising a microinstruction control unit, and particularly to a test-facilitating circuit which is useful for fault diagnosis and failure analysis.

2. Description of the Prior Art

There is self-test technology in the test-facilitating technology for LSI. A self-test is constructed based on signature analysis in which a test-data generating circuit, such as a linear feed-back shift register (LFSR), successively supplies test data to a circuit block to be tested in accordance with a start instruction from a suitable external system, and the output from the circuit block is contained in a signature compression circuit comprising an LFSR, thereafter the output is subjected to a signature compression process. Then, such a series of operations is finished, and the test result (signature) subjected to the signature compression is compared with an expected value which is previously prepared, so as to judge whether or not the object to be tested is a conforming article.

According to such a self-test mechanism, it becomes possible to discriminate whether or not a circuit block to be tested is faulty by comparing the test result and an expected value only once. Thus, the time for which a generally expensive LSI tester should be used can be greatly reduced. However, in this case, since the test procedure can not be observed from the outside, even when a discrepancy between the test result and an expected value is found after the test, it is impossible to recognize from the outside when and how it was generated.

For example, as a microprocessor of CISC (Complex Instruction Set Computer) type to which such a self-test mechanism is applied, there is a device with a construction as shown in FIG. 1.

In FIG. 1, a plurality of circuit blocks 4 are mutually connected to one another through an internal bus 1, and a $\mu$ ROM 2 contains microprograms for a self-test consisting of microinstructions in its microprogram containing area for self-test. Further, a microinstruction decoder 3 decodes the microinstruction contained in the $\mu$ ROM 2, so as to produce control signals for controlling the respective circuit blocks 4. Likewise, a test-data-generating circuit 5 and a signature compression circuit 6 are connected to the internal bus 1 and are respectively controlled by a control signal produced by decoding a microinstruction, so as to carry out self-test on the circuit blocks 4.

As stated above, by making it possible to control the constructional elements necessary for the self-test under a microinstruction in the same control manner as in the circuit blocks to be tested, it becomes possible to reduce the overhead required for the test and to carry out the self-test on such plurality of circuit blocks in series.

In actual implementation, each circuit block is basically tested based on a microinstruction used for normal operation. However, since such a microinstruction for normal operation is generally constructed so as to use only limited functions of each circuit block in one step, the test is not carried out most efficiently. Therefore, a great many steps must be required for such a test microprogram and it becomes very difficult to contain the whole body of the test microprograms in the test microprogram containment area of the $\mu$ ROM 2. This problem has great influence particularly on recent CISC type microprocessors in which a plurality of high-function circuit blocks are contained. Thus, in order to solve this problem, there is proposed a construction as shown in FIG. 2, in which a plurality of multiplexers 26 (MUX 1, MUX 2, MUX 3) are disposed between a $\mu$ ROM 2 and a microinstruction register 8 so as to select a counter 22 for carrying out count operation under a microloop instruction or the like in place of the $\mu$ ROM 2 in accordance with a select signal which is contained in a self-test-control-information-containing ROM 23 and transferred through a register 25. Moreover, in such a construction, a test microprogram for each circuit block is coded into such a form as to use the microloop instruction, and the whole body of self-test is controlled by a self-test control circuit 21. As a result, it becomes possible to supply a plurality of test microinstructions to corresponding circuit blocks to be tested by one step of the test microprogram in the $\mu$ ROM. Accordingly, the number of steps of the test microprogram to be contained in the $\mu$ ROM can be greatly reduced into a range corresponding to the practical use. The increase of hardware required for such an arrangement is not so large. Thus, since the microinstruction control self-test has many merits as described above, it can be sufficiently applied to a large scale microprocessor.

On the other hand, in production of large scale LSI, reduction of the development term becomes an important problem in the competition of the industry. However, it is too time-consuming for competition to take a procedure of developing and evaluating respective functional blocks, then incorporating these functional blocks in a large scale LSI which is a true object of the development. Therefore, it is necessary to develop the whole body of the LSI from the first stage. To this end, the respective functional blocks should be efficiently evaluated almost independently in the incorporated state in such an LSI. Accordingly, the test-facilitating technology for efficiently carrying out fault diagnosis and failure analysis on each circuit block in a large scale LSI becomes important.

As a microprocessor for efficiently carrying out such fault diagnosis and failure analysis on each circuit block controlled under a microinstruction there is, for example, a construction as shown in FIG. 3.

In the construction of the same drawing, for initial setting, a microinstruction including an instruction for providing operation of a circuit block 7 to be tested for fault diagnosis is inputted in a scanning manner to a microinstruction register 8 comprising a scan chain. At the same time, information for selecting an interface circuit (or interface element) 10 which serves as an interface between a circuit block to be used in the fault diagnosis and an internal bus 9 is inputted in a scanning manner to a scan chain 11 for fault diagnosis.

Thereafter, the inputted information is fixed, and a series of operations, comprising supply of test data to the circuit block 7 from a data pin 12; containment of operation of the circuit block 7 to be subjected to the diagnosis in accordance with a control signal obtained by decoding the microinstruction inputted to the microinstruction register 8 by means of a microinstruction decoder 13 and the result thereof; and reading of the contained data to the outside from the data pin 12 or an address pin 14. This is carried out in accordance with a control signal generated at a TGEN circuit 15.

According to such a series of operations, since suitable test data which are necessary for the fault diagnosis and failure analysis can be supplied to a circuit to be tested, and further since the test procedure can be observed from the outside, it becomes possible to efficiently carry out effective and sufficient fault diagnosis and failure analysis.

Accordingly, such a self-test method is extremely effective for carrying out a shipping test on the related articles with efficiency. However, the method is not yet satisfactory for efficiently carrying out the fault diagnosis and failure analysis.

Namely, in such a self-test, since the test result is judged based on data (signature) processed by signature compression as stated above, only a few pieces of information can be obtained from the test procedure. Moreover, in order to suppress the cost increase to be caused by increasing the chip area, it is necessary to minimize the area occupied by the testing circuit. Therefor, it is very difficult to incorporate into the chip a circuit which can generate satisfactory test data for fault diagnosis and failure analysis. In particular, in the self-test mechanism based on the microinstruction control, since the test data generating circuit is owned in common by a plurality of circuit blocks to be tested, the above-stated problem can not be ignored.

Moreover, since each test data is fixed and can not be changed after the circuit design, it is very difficult to alter the test data or add new test data, for example, in the case of a self-test in a shipping test for mass production.

In contrast with such self-tests, there is a self-test method based on the BILBO (Built-In Logic Block Observer) method, which has a construction able to carry out scan input-output of input-output registers for enabling the fault diagnosis and failure analysis. However, since such a self-test method is based on scan transfer of serial data, the efficiency of the fault diagnosis and failure analysis is relatively low. Therefore, the BILBO method is not suitable for efficient fault diagnosis and failure analysis on such a plurality of circuit blocks of multi-bit output type respectively connected to the internal bus as those included in a recent microprocessor.

Therefore, such circuit blocks for which the self-test and the fault diagnosis and failure analysis are necessary have been so far tested either by a circuit for the self-test and another circuit for the fault diagnosis and failure analysis or by only a circuit for the fault diagnosis and failure analysis as well as the shipping test.

However, in the former method, the test circuits occupy a relatively large area. Moreover, since two kinds of test circuits are incorporated together, the circuit construction is very complex.

On the other hand, in the latter case, the merit of a self-test can not be obtained even when the circuit blocks to be tested are suitable for the self-test. Further an expensive LSI tester must be used for a long time even for the shipping test.

As explained above, the self-test and the fault diagnosis and failure analysis on circuit blocks to be subjected to the self-test are very essential factors for microprocessors including a plurality of circuit blocks to be respectively controlled under a microinstruction. Therefore, as a conventional test-facilitating mechanism for microprocessors, the above-mentioned former method is generally adopted.

As a result, in a conventional microprocessor incorporating such a test-facilitating circuit, the hardware construction for the test must be very large and complex, and it becomes very difficult to reduce the chip area and facilitate the circuit design.

SUMMARY OF THE INVENTION

Therefore, it is an object of the present invention to provide a test-facilitating circuit for information processing devices, which can be widely used and has a simple construction.

Moreover, it is another object of the present invention to provide a test-facilitating circuit for information processing devices, in which the self-test mode and the failure analysis mode can be suitably selected.

To achieve the above-stated objects, a test-facilitating circuit for information processing devices according to the present invention comprises an operational mode register for indicating an operational mode of an information processing device, a memory in which are contained microinstructions necessary for carrying out a first and a second test mode, a test data generating circuit for generating a test data necessary for the first test mode, a gate which is connected to the test data generating circuit and the operational mode register, and transfers a test data from the test data generating circuit to an internal bus in accordance with the microinstruction when the operational mode register designates the first test mode, and always prohibits the test data transfer from the test data generating circuit to the internal bus irrespectively of the microinstruction when the operational mode register designates the second test mode, an external-test-data-inputting circuit which is operatively connected to the internal bus and an external input terminal of the information processing device, and prohibits data transfer from the external input terminal to the internal bus when the operational mode register designates the first test mode, and transfers a test data given to the external input terminal to the internal bus in accordance with the microinstruction designating the test data transfer from the test data generating circuit to the internal bus when the operational mode register designates the second test mode, and a test-result-outputting circuit which is operatively connected to the internal bus and an external output terminal of the information processing device, and transfers a data on the internal bus to the external output terminal when the operational mode register designates either the first or the second test mode.

Accordingly, based on the above-mentioned construction, a preferred embodiment of the present invention is so constructed as to collectively carry out the supply of test data and the output of test results to the outside within the parallel data width and to execute the second test mode on a plurality of circuits to be tested respectively connected to the internal bus by using a microinstruction control test sequence for controlling the first test mode of the circuits to be tested.

DETAILED DESCRIPTION OF THE PREFERRED EMBODIMENTS

Hereinafter, an embodiment of the present invention will be explained with reference to the drawings.

Figure 1:
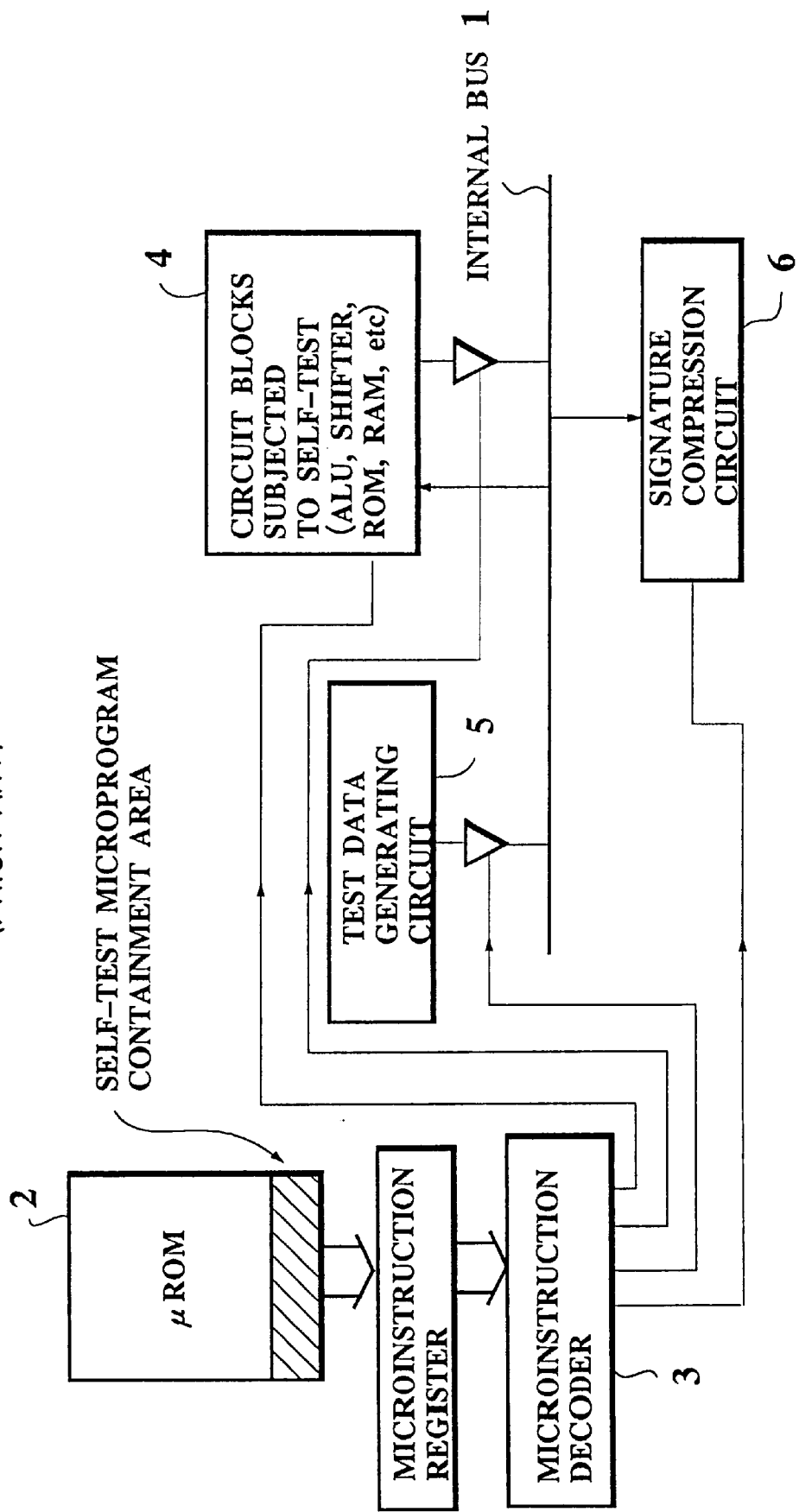
FIGS. 1, 2 and 3 are diagrams respectively showing constructions of conventional test-facilitating circuits for information processing devices.
Figure 2:
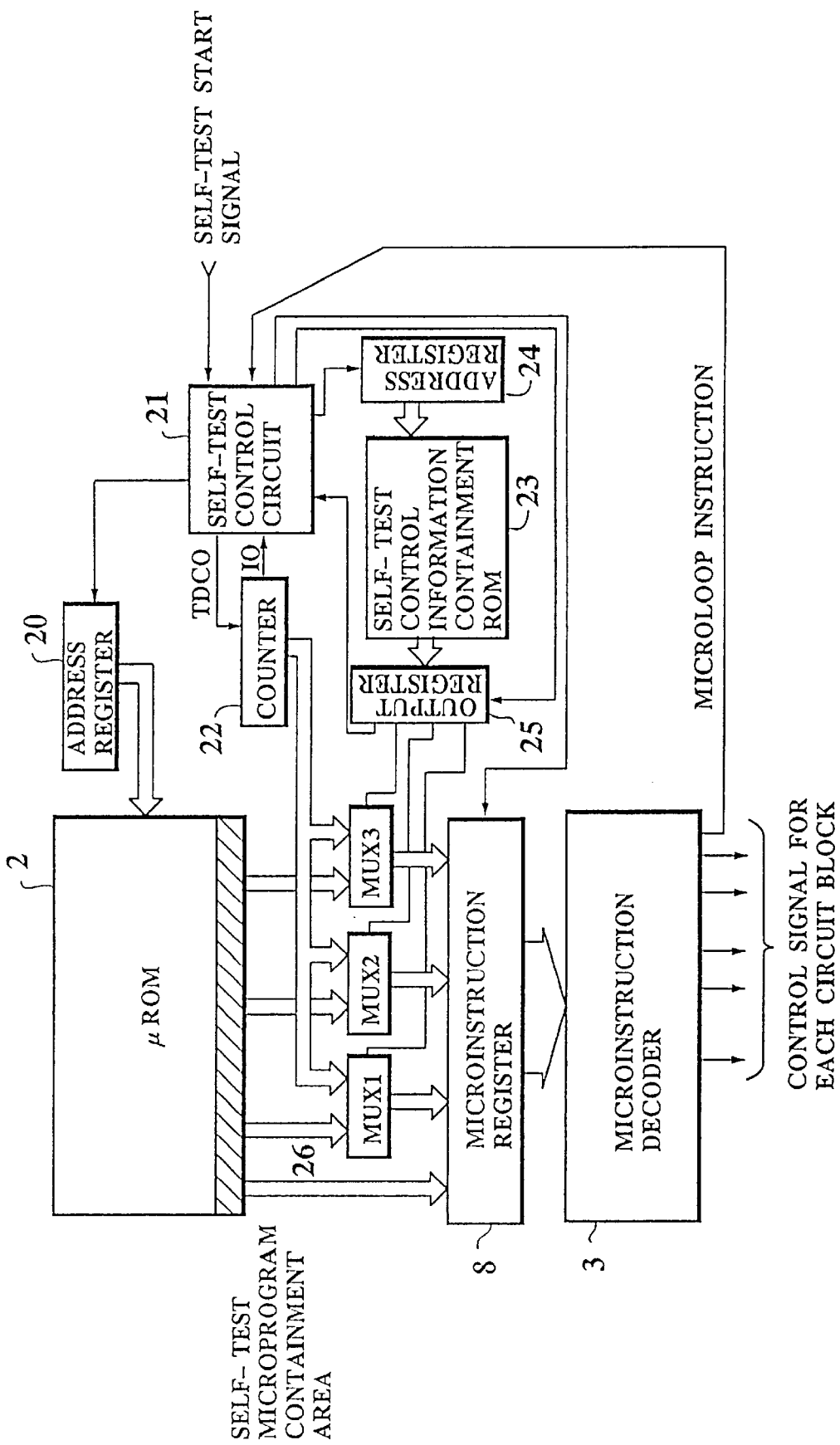
Figure 3:
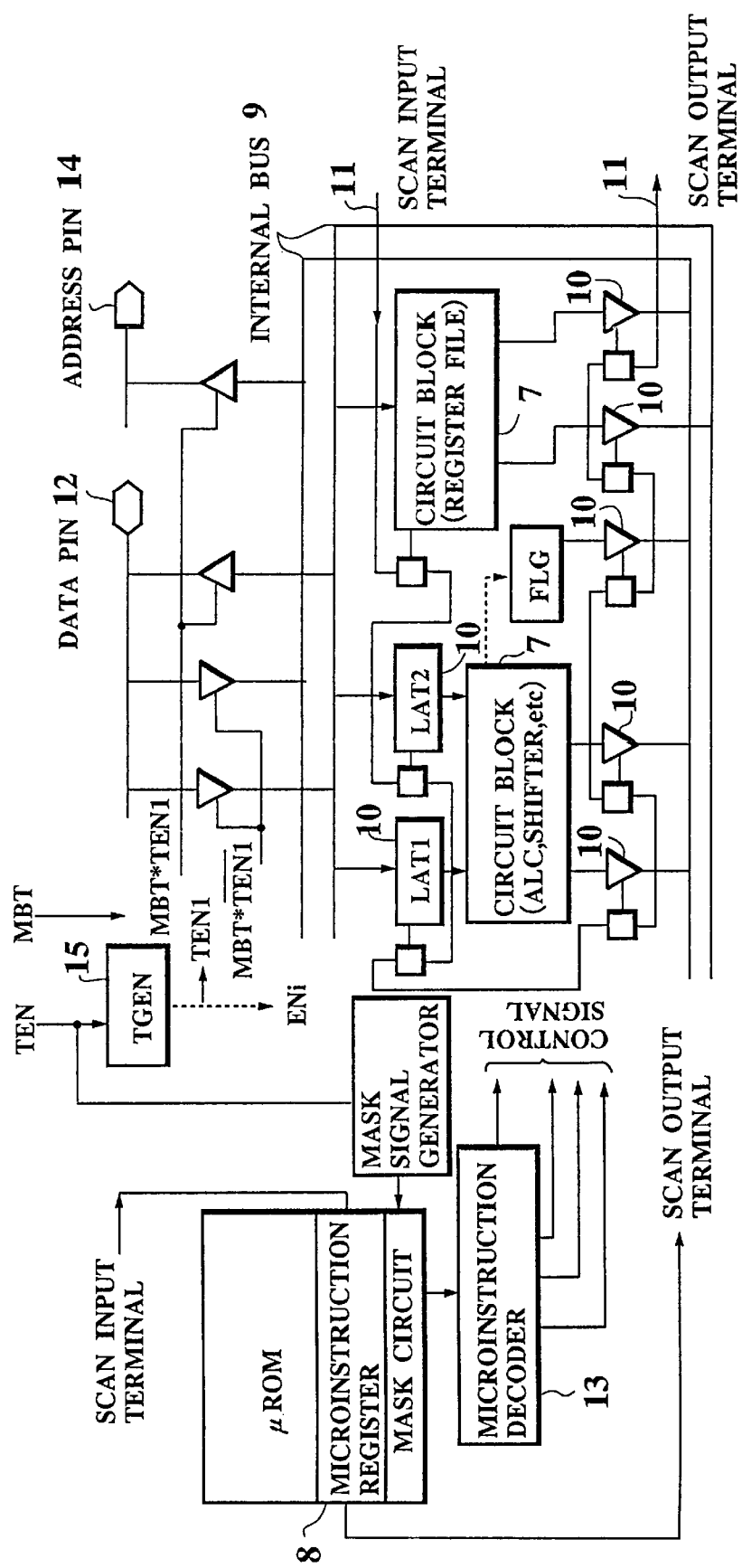
Figure 4:
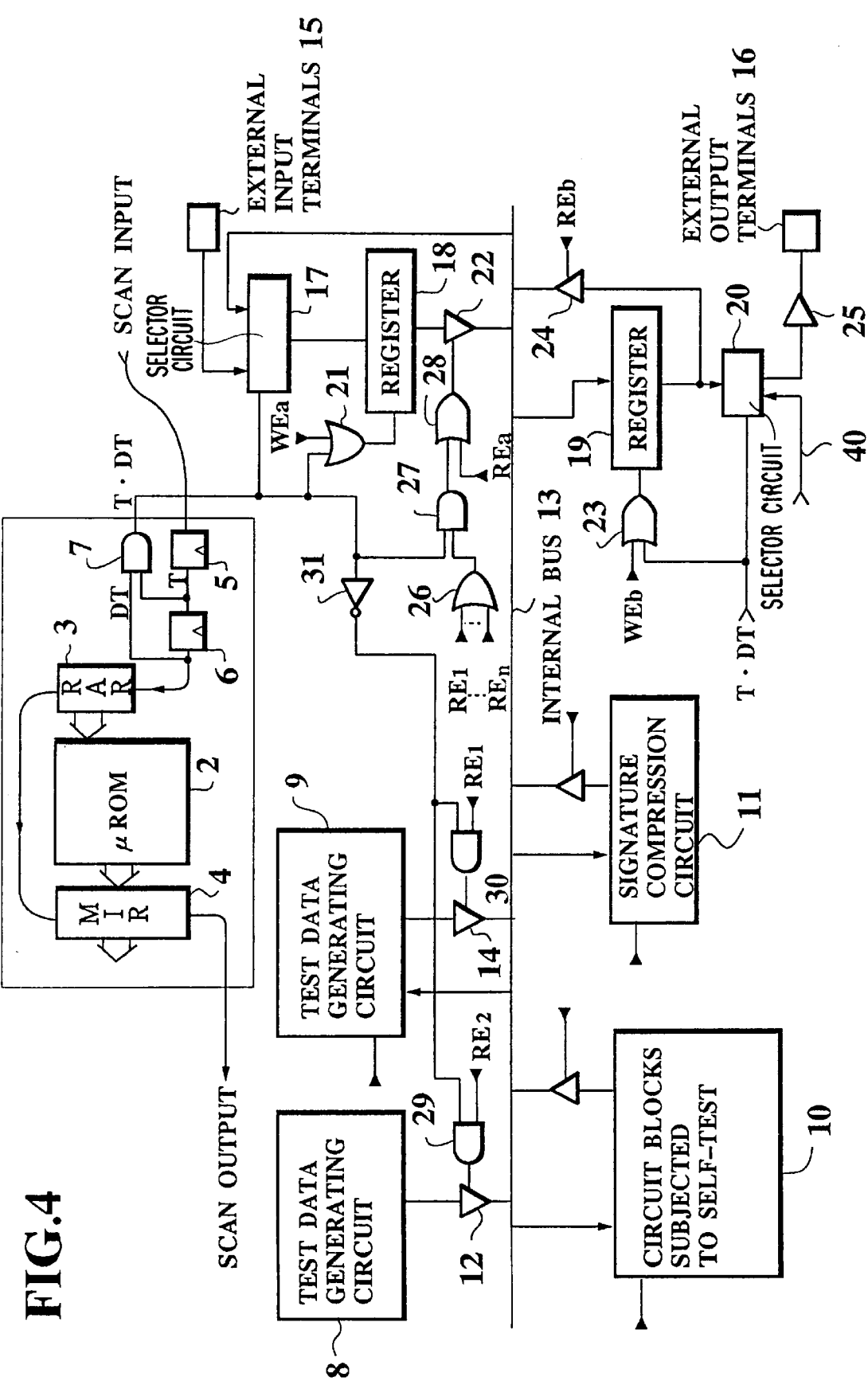
FIG. 4 is a diagram showing a construction of a test facilitating circuit for information processing devices related to an embodiment of the present invention.

FIG. 4 is a diagram to show an important part of an information processing device including a test-facilitating circuit related to an embodiment of the present invention. The processing device is an LSI comprising a one-semiconductor chip.

In FIG. 4, there is partly shown an information processing device in which data transfer between respective circuit blocks to be controlled under a microinstruction is carried out through an internal bus. Moreover, in the information processing device, fault diagnosis and failure analysis on circuits blocks to be subjected to self-test and controlled under a microinstruction are carried out directly from the outside by executing the microinstruction control sequence for the self-test. Besides, a circuit part for the self-test and another circuit part for the fault diagnosis and failure analysis are formed separately.

In the above-mentioned construction, the information processing device has the following four operational modes.

(1) Normal operation mode: mode for carrying out operations originally programmed in the device.
(2) Self-test operation mode: mode for carrying out a self-test on circuit blocks to be tested under microinstruction control.
(3) Fault-diagnosis/failure-analysis operation mode: mode for carrying out fault diagnosis and failure analysis on circuit blocks to be subjected to the self-test.
(4) Scan operation mode: mode for scan operation of flip-flops and registers capable of data scan input-output.

Among these operational modes, the scan operation mode is the most preferential operational mode as compared with the other modes, and is compulsorily set from the other operational modes in accordance with a scan operation mode signal to be activated by a control signal given from the outside.

On the other hand, operational modes other than the scan operation mode are controlled by a microinstruction control block 1.

The microinstruction control block 1 comprises a $\mu$ ROM 2 for containing microprograms consisting of microinstructions, an address register (RAR) 3 for holding an address for designating a microinstruction contained in the $\mu$ ROM 2, and an output register (MIR) 4 for holding a microinstruction read out from the $\mu$ ROM 2.

In such a construction, each microinstruction held in the output register 4 is given to a microinstruction decoder (not shown), then decoded into control signals including activating signals. Then, the control signals are given to circuit elements or circuit blocks, such as output buffers, directly or through logic gates. Incidentally, the input of each control signal is denoted by "▼" in FIG. 4. Moreover, the operation of each circuit block or circuit element is controlled for the normal operation or for the self-test or the fault diagnosis and failure analysis in accordance with the control signal or a signal T or DT as will be explained next.

The microinstruction control block 1 further comprises flip-flops (hereinafter called "F/F") 5, 6 and an AND gate 7.

These F/F 5, 6 are respectively provided for holding signals to provide the three operational modes other than the scan operation mode. Among these signals, when the signal to be held in and outputted from F/F 5 is "T", and the signal held in and outputted from F/F 6 is "DT", these three operational modes are respectively designated based on the following logical values.

| | |
|---|---|
| T = 0 | Normal operation mode |
| T = 1, DT = 0 | Self-test operation mode |
| T = 1, DT = 1 | Fault-diagnosis operation mode |

Accordingly, the normal operation mode, self-test operation mode and fault-diagnosis mode are respectively expressed by $\overline{T}$, $T\cdot\overline{DT}$ and $T\cdot DT$.

In this case, the self-test operation and the test operation for the fault diagnosis and failure analysis are generally separated by one signal (signal T). The object of the separation is to certainly carry out the self-test (or fault diagnosis) while ignoring uncertain signals from circuits other than the object to be subjected to the self-test (or fault diagnosis) by the self-test mode (or fault diagnosis mode), and to reduce the hardware construction by designating both test operation modes with the same signal T because the microinstruction control sequence of the self-test is executed even in the fault diagnosis mode.

In F/F 5, "0" (corresponding to the signal T) is set in accordance with a reset signal given from the outside, thereby to start the normal operation. Moreover, by combination of the reset signal and a suitable specific external input signal, "1" (corresponding to the signal T) is set in F/F 5, thereby to start the self-test mode. Then, when the self-test is finished, "0" (corresponding to the signal T) is set, and the normal operation starts.

While, with respect to F/F 6, since the output signal DT is used only for the fault diagnosis, "0" (corresponding to DT) is set in accordance with a reset signal given from the outside.

Moreover, F/F 5, 6 are so constructed as to carry out a scan operation in accordance with a control signal given from the outside in order to carry out initialization for starting the fault diagnosis together with the $\mu$ ROM address register (RAR) 3 and the microinstruction register (MIR) 4. Therefore, in F/F 5, 6, "1" (corresponding to the signals T, DT) is set by the scan operation for the fault diagnosis.

The AND gate 7 receives the output signals T, DT of the respective F/F 5, 6, and produces a fault diagnosis operation mode signal. Accordingly, when the output signal of the AND gate 7 is at the "0" level, the operational is set in the normal operation mode or self-test operation mode, while when the output signal is set at the "1" level, the fault diagnosis mode is set.

Next, a construction related to the self-test mode is explained. The construction related to the self-test mode comprises test data generating circuits 8, 9, a circuit block 10 to be subjected to the self-test and a signature compression circuit 11.

Moreover, the test data generating circuit 8 comprises a ROM for containing fixed test data. The test data generating circuit 9 comprises a shift register or LFSR in which an initial value of test data can be set under the microinstruction control. Besides, the circuit 9 may also be so constructed as to have a plurality of test data generating modes to be designated by the microinstruction control. Furthermore, the test data generating circuit 9 is so constructed as to successively generate different test data by a one-bit shift operation or feed-back operation every time of access by the microinstruction.

From the test data generating circuit 8, each test data contained therein is outputted to an internal bus 13 through an output buffer 12. On the other hand, an initial value of each test data is set in the test data generating circuit 9 through the internal bus 13, then the resultant test data is outputted to the internal bus 13 through an output buffer 14.

In the internal bus 13, data comprising a plurality of bits can be collectively transferred. Accordingly, in case of data transfer for circuit blocks and circuit elements respectively connected to the internal bus 13 through the same bus 13, all of the data can be collectively transferred within the data width of the internal bus 13.

As the test data used in this case, there can be test data for testing a data path portion of a circuit to be tested in a narrow sense, a data for initializing the microinstruction sequence, for example, a loop number of the microinstruction, a test data generation mode and an initial value of the test data generating circuit 9, a data such as an initial value of the signature compression circuit 11, and data for initializing various flags. From the viewpoint of extended application of the microinstruction program used in the self-test for the fault diagnosis, it is preferred that some of these data are able to be controlled under the microinstruction. For example, if the loop number of the microinstruction can be set at a value much larger than that in the self-test, it becomes possible to increase the number of test data in a narrow sense which can be used for carrying out the fault diagnosis for circuit blocks.

Accordingly, the test data includes those which are desired to be controlled in the fault diagnosis. On the other hand, it is also possible that each circuit for holding these data is so constructed as to carry out the scan operation for its initialization before the fault diagnosis.

The circuit block 10 which is an object of the self-test is an operation circuit such as an ALU or a shifter, ROM or RAM. While, the signature compression circuit 11 is composed of an LFSR, and holds the test result outputted from the circuit block 10 through the internal bus 13 in the signature-compressed form, then outputs the signature (the accumulated result of the test) to the internal bus 13.

Next, the construction related to the fault diagnosis or failure analysis that is a feature of the present invention is explained.

In FIG. 4, the construction used for the fault diagnosis or failure analysis mainly comprises external input terminals 15, external output terminals 16, a selector circuit 17, registers 18, 19, a selector circuit 20 and logic gates.

The number of the external input terminals 15 corresponds to the data width of the internal bus 13, so as to collectively receive a test data comprising a plurality of bit widths from an external unit, for example, an LSI tester for the fault diagnosis. Likewise, the number of the external output terminals 16 corresponds to the data width of the internal bus 13, so as to give the result of fault diagnosis to an external unit, for example, an LSI tester.

Incidentally, in an information processing device such as a microprocessor, it is possible to use data input terminals or data output terminals, or address terminals as the above-mentioned terminals. If the input of test data or output of test results can be carried out without any problems, it is also possible to use input-output terminals.

The selector circuit 17 selects parallel test data given through the respective external input terminals 15 or data given from the internal bus 13 in accordance with the fault-diagnosis operation mode signal (T·DT). Namely, when the fault-diagnosis operation mode signal (T·DT) is set at the "1" level, that is, the operational mode is set in the fault-diagnosis operation mode, the selector circuit 17 selects the test data given from the outside through the external input terminals 15. When the fault-diagnosis operation mode signal is set at the "0" level, the circuit 17 selects the data given from the internal bus 13. Thereafter, the selected data are given to the register 18.

The register 18 receives and holds the data given from the selector circuit 17 when the output of an OR gate 21 is the "1" level. Moreover, the register 18 receives and holds the test data selected by the selector circuit 17 for the fault-diagnosis operation mode, or data given from the internal bus 13 for the normal operation mode or self-test operation mode. Then, the data held in the register 18 are outputted to the internal bus 13 through an output buffer 22.

Accordingly, by providing the register 18 as described above, it is possible to utilize a register comprising a relatively simple control logic to be used in the normal operation mode of such devices. Moreover, the register 18 functions as a holding circuit for enabling the supply of test data given from the outside to the internal bus 13 for the fault diagnosis. In such a manner, by utilizing such a register originally provided in the device also for the fault diagnosis operation, the constructional overhead necessary for the fault diagnosis is suppressed.

The register 19 receives and holds the data given from the internal bus 13 when the output of OR gate 23 is the "1" level. Namely, the register 19 receives and holds the data given through the internal bus 13 for the normal operation or self-test operation mode, and outputs the data to the internal bus 13 through an output buffer 24. On the other hand, the register 19 receives and holds the test results given through the internal bus 13 for the fault diagnosis operation, then the held test results are given to the external output terminals 16 through the selector circuit 20, whose inputs are connected to the output of the register 19 and the output 40 of a circuit for the normal operation, and through an output buffer 25.

Accordingly, by providing the register 19 as described above, it is possible to utilize a register which is originally provided in the device in the same manner as the register 18. Moreover, the register 19 functions as a holding circuit for enabling output of test data and results supplied on the internal bus 13 to the outside for the fault diagnosis.

As explained above, both of the registers 18, 19 temporarily hold data to be inputted or outputted between the outside and the internal bus 13, so as to synchronize the input or output of data with operation of the circuit block in the device.

The selector circuit 20 gives the test result outputted from the register 19 to the output buffer 25 when the fault-diagnosis operation mode signal (T·DT) is the "1" level, and the operation mode is set in the fault diagnosis mode. While, when the fault-diagnosis operation mode signal is the "0" level, and the register 19 and output buffer 25 are not connected to each other, the selector circuit 20 gives the output 40 from the circuit for normal operation to the output buffer 25.

Incidentally, if the operation of the register 19 can be checked in the normal operation mode so as to make it possible to observe the contents of the internal bus 13 on the self-test (through the register 19) from the outside, it becomes possible to easily carry out depugging the self-test in the development stage or simple failure analysis on the circuit blocks in the mass-production stage. Moreover, this operation can be realized by changing the select signal to be outputted to the selector circuit 20 and the input signal to the OR gate 23 into the signal T from the fault-diagnosis operation mode signal (T·DT) (so as to observe the contents of the internal bus 13 every cycle).

Next, logic gates for controlling input and output of data between the registers 18, 19 and the internal bus 13, and other logic gates for controlling output of the test data generating circuits 8, 9 in the self-test operation mode and fault-diagnosis operation mode are explained.

In FIG. 4, if there is not the fault-diagnosis operation mode which is one of the features of the present invention, and there are only the normal operation and the self-test operation modes, an input activating signal for the registers 18, 19 and an output activating signal for the output buffers 12, 14, 22, 24 are respectively designated as WE*, RE* (* means an adequate identifier).

The OR gate 21 for controlling input of the register 18 inputs the fault-diagnosis operation mode signal (T·DT) and the input activating signal WEa, and controls input of the register 18 by using the OR output (WEa+T·DT) as an input activating signal for the register 18. Accordingly, when the fault-diagnosis operation mode signal (T·DT) is the "1" level and the operation mode is set in the fault diagnosis operation mode, or when the input activating signal WEa is the "1" level for the normal operation mode or self-test operation mode, the register 18 is in the state capable of receiving data.

The output control of the output buffer 22 for outputting the data held in the register 18 to the internal bus 13 is carried out by means of the OR gates 26, 28 and AND gate 27. When each output activating signal of these output buffers corresponding to each test data generating circuit is designated as REi (i=1, 2, ..., n), the OR gate 26 inputs these output activating signals RE1 to REn. While, the AND gate 27 inputs the output of the OR gate 26 and the fault-diagnosis operation mode signal. Moreover, the OR gate 28 inputs the output of the AND gate 27 and the output activating signal REa of the output buffer 22 in the no fault-diagnosis operation mode, then controls the output of the output buffer 22 by the output thereof.

In such a construction, the output of the output buffer 22 is controlled by an output activating signal designated as REa+T·DT·(RE1+RE2+ ... +REn). Accordingly, in the fault-diagnosis operation mode, the output buffer 22 is set in the state capable of output in a timing at which the microinstruction sequence of the self-test is executed, and the control signal is given to any one of the test generating circuits (i.e., any one of RE1 to REn is set at the "1" level). On the other hand, in the normal operation mode or self-test operation mode, the output buffer 22 is set in the state capable of output when the output activating signal REa is given to the OR gate 28.

Moreover, the OR gate 23 for controlling the input of the register 19 inputs the input activating signal WEb and the fault-diagnosis mode signal (T·DT), and controls the input of the register 19 by using the OR output (WEb+T·DT) as an input activating signal for the register 19. Accordingly, when the fault-diagnosis mode signal (T·DT) is the "1" level and the operation mode is set in the fault-diagnosis operation mode, or when the input activating signal WEb is the "1" level for the normal operation mode or self-test operation mode, the register 19 is set in the state capable of receiving data. Incidentally, as stated above, when the fault-diagnosis mode signal (T·DT) in the OR output and the select signal (T·DT) of the selector circuit 20 is replaced by the signal T, the contents of the internal bus 13 for the self-test can also be observed from the outside (in this case, it is necessary to carry out the operation check on the register 19 in the normal operation mode).

Moreover, the output of the output buffer 12 for outputting the test data outputted from the test data generating circuit 8 to the internal bus 13 is controlled by an AND gate 29, while the output of the output buffer 14 for outputting the test data outputted from the test data generating circuit 9 to the internal bus 13 is controlled by an AND gate 30.

The AND gate 29 inputs an inverted signal of the fault-diagnosis operation mode signal (T·DT) which is inverted by an inverter gate 31 and the output activating signal RE2, and controls the output of the output buffer 12 by using the AND output of these signals (RE2·$\overline{\text{T·DT}}$) as an output activating signal for the output buffer 12. While, the AND gate 30 inputs an inverted signal of the fault-diagnosis operation mode signal ($\overline{\text{T·DT}}$) and the output activating signal RE1, and controls the output of the output buffer 14 by using the AND output (RE1·$\overline{\text{T·DT}}$) as an output activating signal for the output buffer 14.

Accordingly, when the fault-diagnosis operation mode signal is the "1" level and the operation mode is set in the fault-diagnosis operation mode, even if the output activating signal RE1 or RE2 is set at the "1" level during execution of the microprogram sequence for the self-test, and the output of the output buffer 12 or 14 is designated, since the output of the AND gate 29 or 30 is kept to the "0" level, the output buffer 12 or 14 is not set in the output state.

Incidentally, in the microprograms for the self-test to be executed in the above construction, some device for realizing effective fault diagnosis or failure analysis for the respective circuit blocks should be considered. Namely, since the fault diagnosis or failure analysis is carried out for each circuit block almost independently, it is necessary to prepare the microinstruction program for the self-test in a module form so that each circuit block can be tested almost independently. However, it does not take so much trouble to add this device in the preparation of the test program based on the microinstruction.

In such a construction, in order to start the fault diagnosis or failure analysis operation, initial setting is first carried out. The initial setting is carried out in the scan operation mode. The F/F 5, 6, address register 3 and output register 4 which form a scan chain together in the microinstruction control block 1 are set (T=1, DT=1) for providing for the fault-diagnosis operation mode a first address of the self-test microprogram for a circuit block to be subjected to the fault diagnosis, and a microinstruction for preventing uncertain operation in a clock cycle just after removing the scan operation mode, respectively.

As described above, when the scan operation mode is removed after completion of the initial setting, execution of a self-test microprogram to a desired circuit block is carried out in the fault diagnosis operation mode.

In such a manner, when the initial setting of the fault-diagnosis operation mode is carried out, the fault-diagnosis operation mode signal (T·DT) has the "1" level state. As a result, the output of the output buffers 12, 14 is prohibited, so that test data are not outputted from the test data generating circuits 8, 9. While, the selector circuit 17 is set in the state for selecting data given from the external input terminals 15, and the register 18 is in the state of receiving data given from the selector circuit 17. Moreover, the register 19 is in the state of receiving data given from the internal bus 13, while the selector circuit 20 is in the state of giving data outputted from the register 19 to the external output terminals 16 through the output buffer 25.

In such a state, when the self-test microprogram is executed, and the output activating signal RE1 or RE2 is outputted, since the fault-diagnosis operation mode signal is at the "1" level state, test data are not outputted to the internal bus 13 from the test data generating circuit 8 or 9.

On the other hand, test data for the fault diagnosis or failure analysis are supplied to the device from, for example, an external LSI tester, then given and held in the register 18 through the selector circuit 17 previously by one clock cycle to the time when the output activating signal RE1 or RE2 is outputted, then one clock cycle later, the test data held in the register 18 are given to the internal bus 13 in synchronism with the internal operation through the output buffer 22 at the time when test data are given to the internal bus 13 from the test data generating circuit 8 or 9 if in the self-test operation mode. Thereafter, each of the test data given to the internal bus 13 is supplied to each circuit block designated in advance, so as to carry out the fault diagnosis or failure analysis on the circuit block.

Then, the test result of fault diagnosis or failure analysis is given and held in the register 19 through the internal bus 13. Moreover, each test result is outputted from the register 19 one clock cycle later than the time of its holding, then given to an external unit, for example, an LSI tester from the external output terminals 16 through the selector circuit 20 and output buffer 25, so as to be compared with an expected value prepared in advance.

Accordingly, by repeating the above-stated operation in synchronism with the internal clock cycles, the fault diagnosis or failure analysis over all of the circuit blocks to be tested can be completed.

As explained above, in the above embodiment, by adding merely a few simple hardware structures to an information processing device capable of the self-test to directly utilize the self-test microprograms, it becomes possible to effectively and sufficiently carry out the fault diagnosis or failure analysis on desired circuit blocks based only on test data from the outside.

Moreover, since the test data can be collectively given to the circuit blocks to be tested within the data width of the internal bus 13 so as to execute the fault diagnosis or failure analysis, as compared with the above-mentioned BILBO method in which the test data are supplied in a serial manner, it becomes possible to realize the fault diagnosis or failure analysis with far more efficiency. Furthermore, since the test data are given to each circuit block in synchronism with the operation thereof, it also becomes possible to correctly evaluate the AC performance of each circuit block as embedded in an information processing device.

These effects contribute greatly in particular to the reduction of the development term or mass production time of complicated full custom VLSI mainly based on microinstruction control such as CISC type microprocessors and the like.

The test data generating circuit for the self-test has a simple construction and can achieve fair fault coverage. Further it is also possible to realize demanded fault coverage by directly supplying from an LSI tester test data which the test generating circuit can not generate. In such a method, it becomes possible to realize a shipping test in which the chip area and the test cost (or test time) can be minimized in the most suitable balance, such that it contributes greatly to cost reduction for mass production.

Next, another embodiment of the present invention will be explained with reference to FIG. 5.

Figure 5:
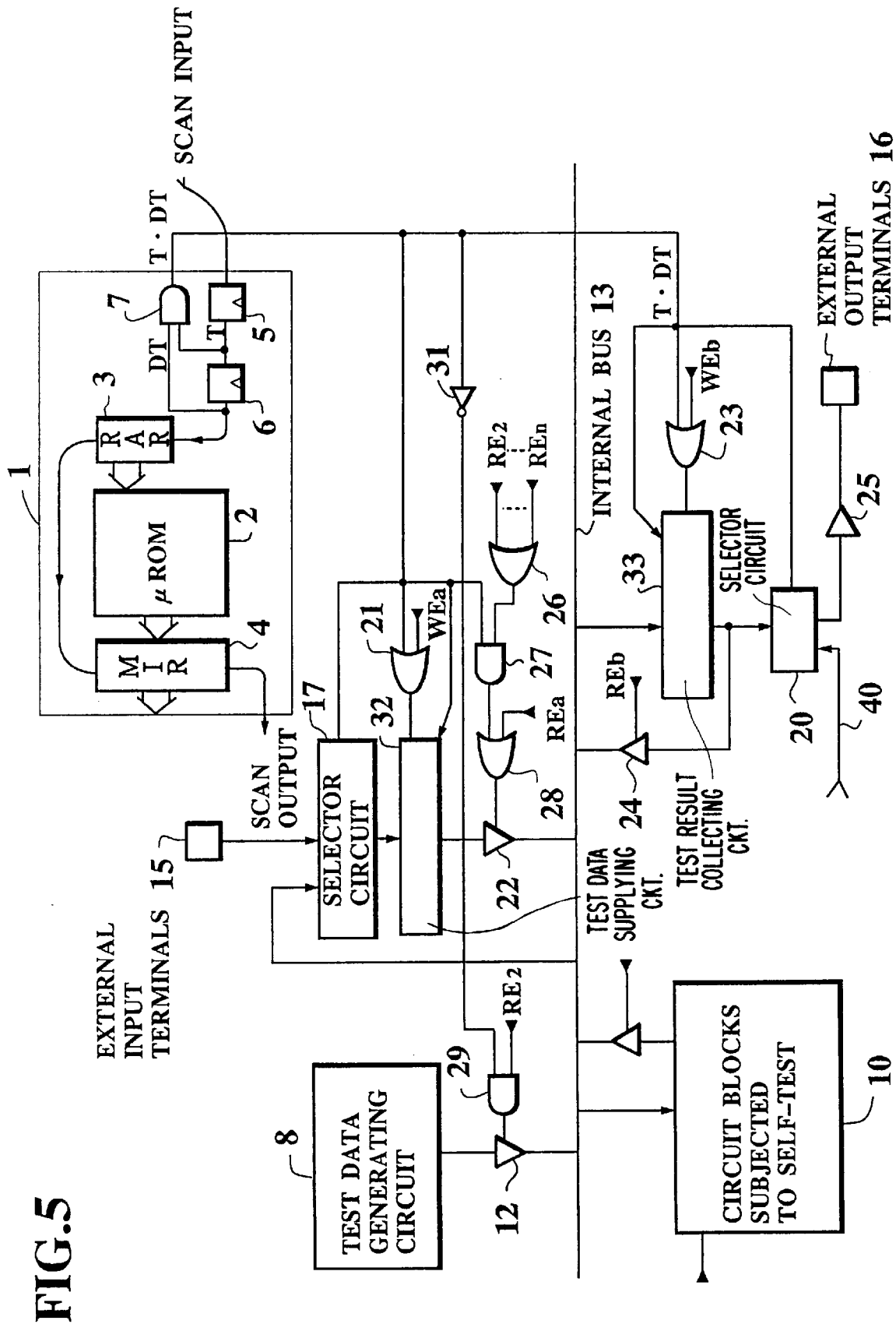
FIG. 5 is a diagram showing a construction of a test facilitating circuit for information processing devices related to another embodiment of the present invention.

FIG. 5 is a constructional diagram to show another embodiment of the present invention. As shown in the same drawing, the feature of this embodiment is characterized by commonizing circuits for receiving test results from the internal bus as well as commonizing circuits for supplying test data to the internal bus for the self-test or the fault diagnosis or failure analysis as compared with the above-described embodiment. Incidentally, in FIG. 5, the same reference numerals or reference characters as those in FIG. 4 are used for the same functions respectively, thus their explanations are omitted here.

In the construction shown in FIG. 5, the test data generating circuit 9 and register 18 in FIG. 4 are commonized into a test data supplying circuit 32, further the signature compression circuit 11 and register 19 in FIG. 4 are commonized into a test result collecting circuit 33.

The test data supplying circuit 32 functions as the test data generating circuit 9 in FIG. 4 for the self-test, and fuctions as a simple register like the register 18 in FIG. 4 for the fault diagnosis or failure analysis. Moreover, the functional operation of the test data supplying circuit 32 is changed by the input of the fault-diagnosis operation mode signal (T·DT). Input control of test data by the test data supplying circuit 32 is carried out in the same manner as the input control by the register 18 shown FIG. 4. However, with respect to the output control of test data by the test data supplying circuit 32, since the output activating signal REa and RE1 are commonized into REa, the output of the output buffer 22 is controlled by an output activating signal designated by REa+T·DT·(RE2+RE3+ . . . +REn).

The test result collecting circuit 33 functions as the signature compression circuit 11 shown in FIG. 4 in the self-test operation mode, and functions as a simple register like the register 19 in FIG. 4 in the fault-diagnosis operation mode. The functional operation of the test result collecting circuit 33 is changed by the fault-diagnosis operation mode signal (T·DT). Moreover, the input-output control of the test results by the test result collecting circuit 33 is carried out in the same manner as the input-output control by the register 19 in FIG. 4.

Accordingly, also in such a construction, it is possible to carry out the same fault diagnosis or failure analysis as carried out in the construction described with reference to FIG. 4, therefore the same effects are also obtained. Moreover, in this embodiment, since the construction for self-test and for fault diagnosis is commonized, it becomes possible to reduce the overhead required for the test circuit. Moreover, since the construction for normal operation and that for these tests can be clearly separated, errors in design likely to be caused by complexity of circuit construction can be suppressed.

As stated above, according to the present invention, by using the microinstruction control test sequence for controlling the first test on circuits connected to the internal bus to be tested, both the supply of test data from the outside and the output of test results to the outside can be collectively carried out, so as to carry out the second test on the circuits to be tested. Accordingly, it becomes possible to provide a test-facilitating circuit capable of realizing efficient and sufficient fault diagnosis or failure analysis in a small size and relatively simple construction.

Various modifications will become possible for those skilled in the art after receiving the teachings of the present disclosure without departing from the scope thereof.

What is claimed is:

1. A test facilitating circuit comprising:
   a test data generating circuit to output first test data, in a first test mode, onto a bus to which a logic circuit under test is connected to receive input data;
   means for transferring second test data at external input terminals onto the bus in a second test mode;
   a micro-ROM in which a program for testing is stored; and
   means, operatively coupled to the bus, for executing the program stored in the micro-ROM in the first test mode and in the second test mode;
   wherein the second test data is transferred from the external input terminals onto the bus through a register which can also receive data from the bus, and wherein the external input terminals and the bus are connected to the register through a selector which selects the second test data supplied through the external input terminals in the second test mode and selects data on the bus when the logic circuit operates in a normal mode.

2. A test facilitating circuit comprising:

a test data generating circuit to output test data, in a first test mode, onto a bus to which a logic circuit under test is connected to receive input data;

a selector having two inputs connected respectively to an external terminal and the bus, for outputting data from said external terminal in a second test mode and data on the bus in said first test mode;

a register for transferring test data from the selector onto the bus in the second test mode; and a built-in self-test circuit for carrying out a test with test data on the bus in the first test mode and in the second test mode.

3. A test facilitating circuit as claimed in claim 2 wherein the built-in self-test circuit includes a micro-ROM in which a program for testing is stored.

4. A test facilitating circuit comprising:

a test data generating circuit for generating and outputting first test data, in a first test mode, onto a bus to which a logic circuit under test is connected for receiving input data;

a selector having two inputs connected respectively to an external terminal and the bus for outputting data from said external terminal in a second test mode and data on the bus in said first test mode;

a register connected to said selector and the bus for receiving data from said selector and outputting the data to the bus in synchronism with a read enabling signal;

a micro-ROM in which a program for testing is stored; and means for executing the program for testing stored in the micro-ROM in the first test mode utilizing said first test data output from said test data generating circuit or in the second test mode utilizing second test data given from said external terminal through said selector.

* * * * *